United States Patent
Renoux et al.

(10) Patent No.: US 11,851,029 B2
(45) Date of Patent: Dec. 26, 2023

(54) WIPER SYSTEM FOR A MOTOR VEHICLE

(71) Applicant: VALEO SYSTEMES D'ESSUYAGE, La Verriere (FR)

(72) Inventors: Pascal Renoux, La Verriere (FR); Nicolas Kuchly, La Verriere (FR); Theo Alexis, La Verriere (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 17/787,830

(22) PCT Filed: Dec. 9, 2020

(86) PCT No.: PCT/EP2020/085374
§ 371 (c)(1),
(2) Date: Jun. 21, 2022

(87) PCT Pub. No.: WO2021/130023
PCT Pub. Date: Jul. 1, 2021

(65) Prior Publication Data
US 2023/0023460 A1    Jan. 26, 2023

(30) Foreign Application Priority Data
Dec. 27, 2019    (FR) ...................................... 1915697

(51) Int. Cl.
*B60S 1/40* (2006.01)
*B60S 1/38* (2006.01)

(52) U.S. Cl.
CPC ........... *B60S 1/4041* (2013.01); *B60S 1/3865* (2013.01); *B60S 2001/409* (2013.01)

(58) Field of Classification Search
CPC ............. B60S 1/38; B60S 1/407; B60S 1/381
See application file for complete search history.

(56) References Cited

U.S. PATENT DOCUMENTS 3,147,507 A    9/1964    Glynn
6,634,056 B1    10/2003    De Block
(Continued)

FOREIGN PATENT DOCUMENTS

DE    19952054 A1    5/2001
DE    102011089922 A1    6/2013
(Continued)

OTHER PUBLICATIONS

European Patent Office, International Search Report (with English translation) and Written Opinion of corresponding International Application No. PCT/EP2020/085374, dated Feb. 24, 2021.

*Primary Examiner* — Michael D Jennings
(74) *Attorney, Agent, or Firm* — Valeo Systemes d'Essuyage

(57) ABSTRACT

The invention relates to a wiper system for a motor vehicle, comprising a drive arm and a wiper which are connected to one another by a connecting device which comprises a connector secured to the wiper and a connecting shaft, the drive arm comprising a first end via which it is attached to a drive means, and a second end, opposite to the first end in a longitudinal direction of the drive arm, the connecting device comprising a receiving housing for receiving the connecting shaft, the receiving housing comprising an entrance by means of which the connecting shaft is received in the receiving housing and a locking zone for locking the connecting shaft, characterized in that the locking zone is positioned between the entrance of the receiving housing and the second end of the drive arm.

5 Claims, 7 Drawing Sheets

(56) References Cited

U.S. PATENT DOCUMENTS

| | | |
|---|---|---|
| 2015/0096142 A1 | 4/2015 | Zeiser et al. |
| 2017/0136996 A1* | 5/2017 | Poton .................... B60S 1/4045 |
| 2017/0369036 A1* | 12/2017 | Houssat .................... B60S 1/40 |
| 2018/0265046 A1* | 9/2018 | Grasso .................... B60S 1/407 |

FOREIGN PATENT DOCUMENTS

| | | |
|---|---|---|
| EP | 2965958 A1 | 1/2016 |
| EP | 3170710 A1 | 5/2017 |
| FR | 2389519 A1 | 12/1978 |
| GB | 1603264 A | 11/1981 |
| WO | 0234595 A1 | 5/2002 |

* cited by examiner

[fig 1]
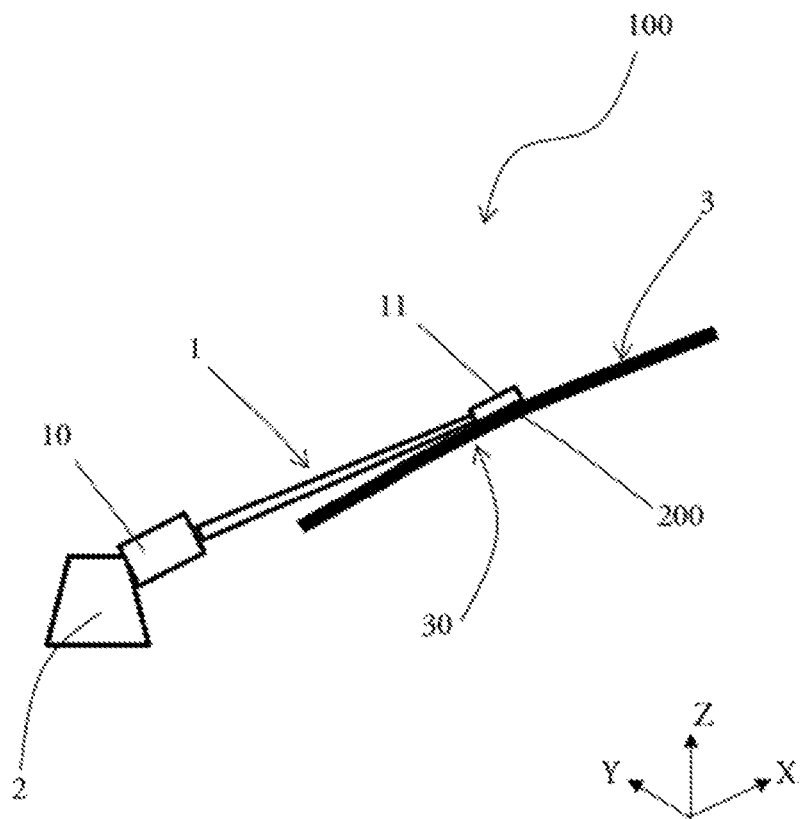

[fig 2]
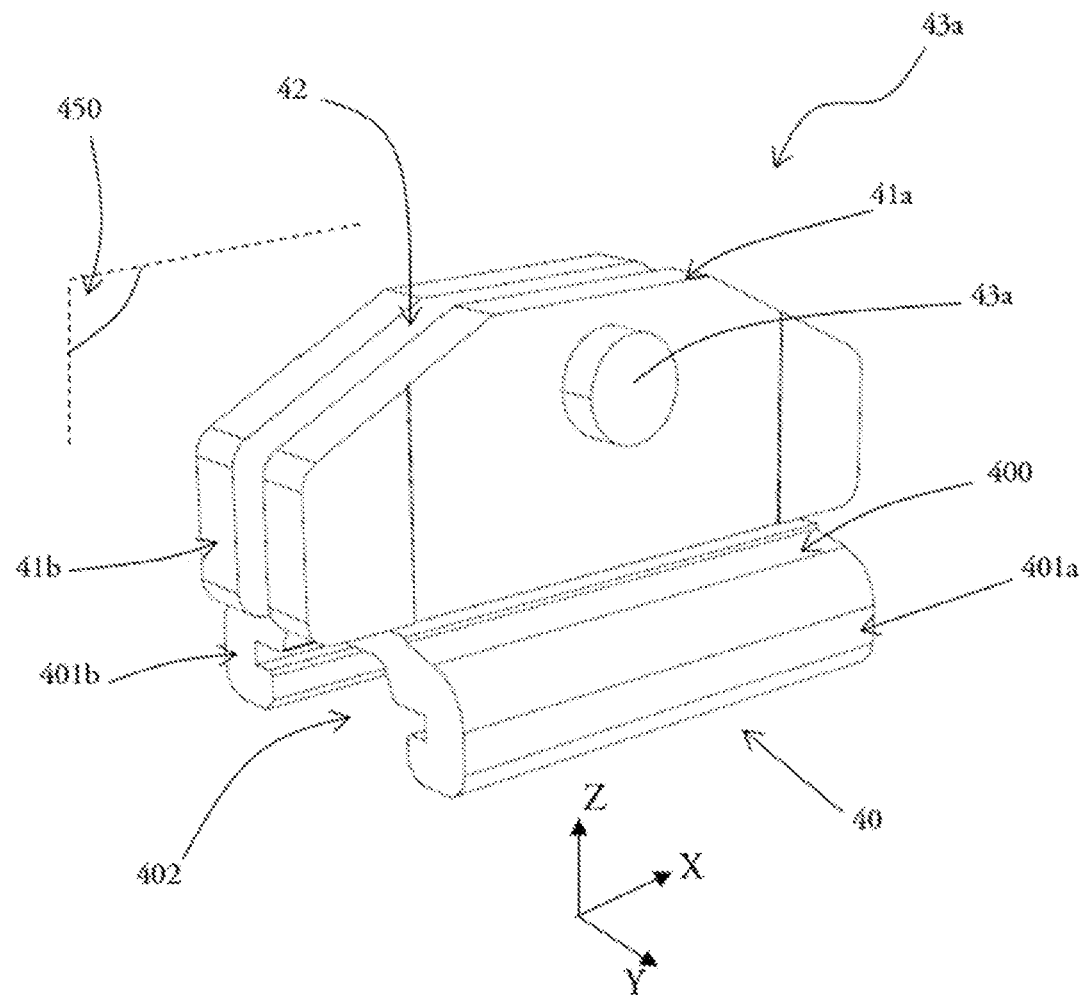

[fig 3]
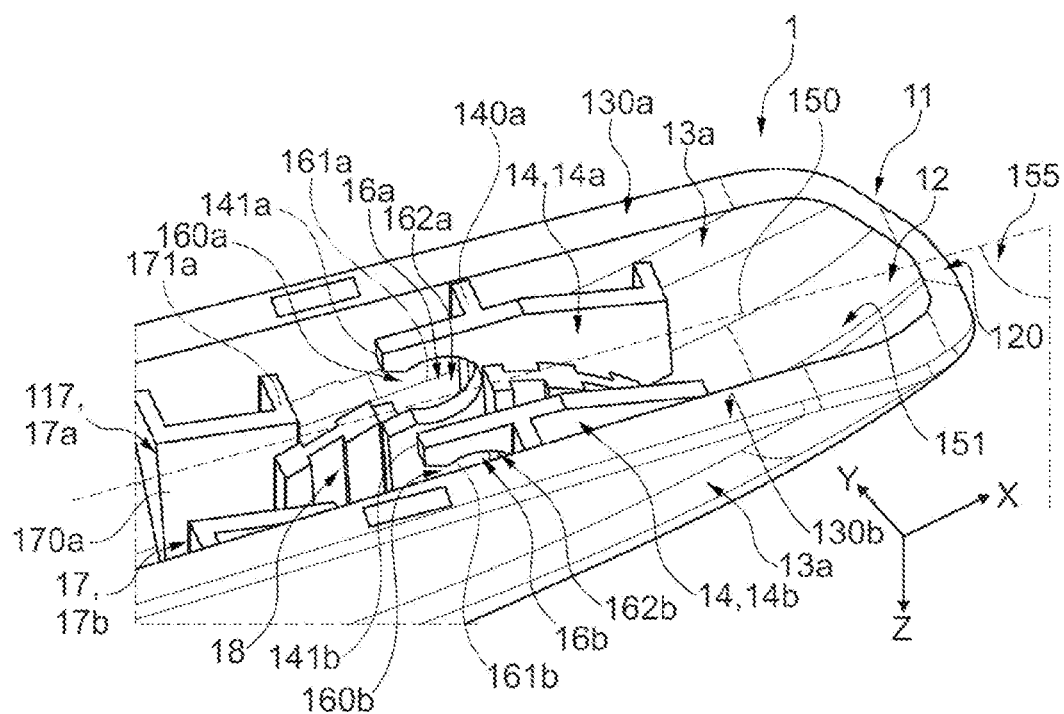

[fig 4]
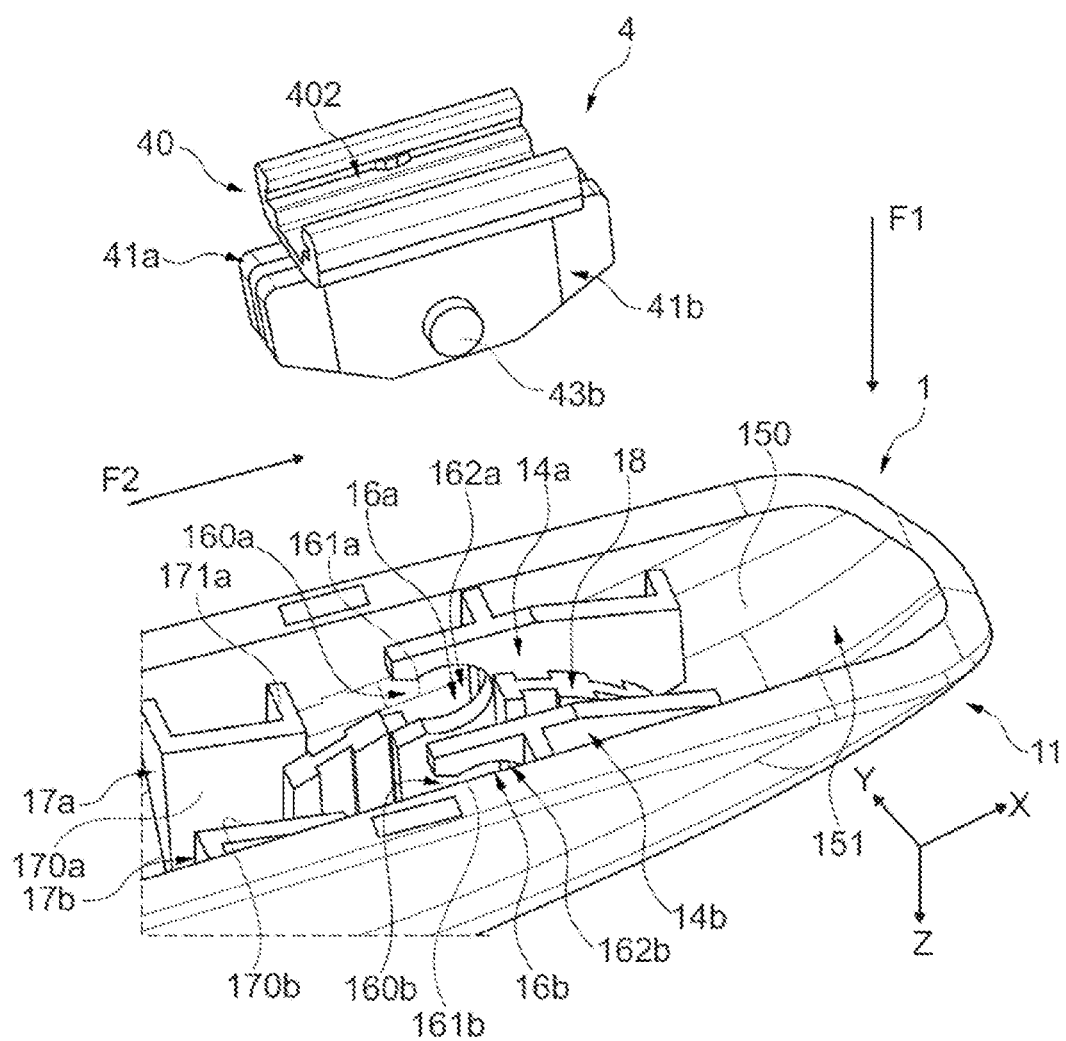

[fig 5]
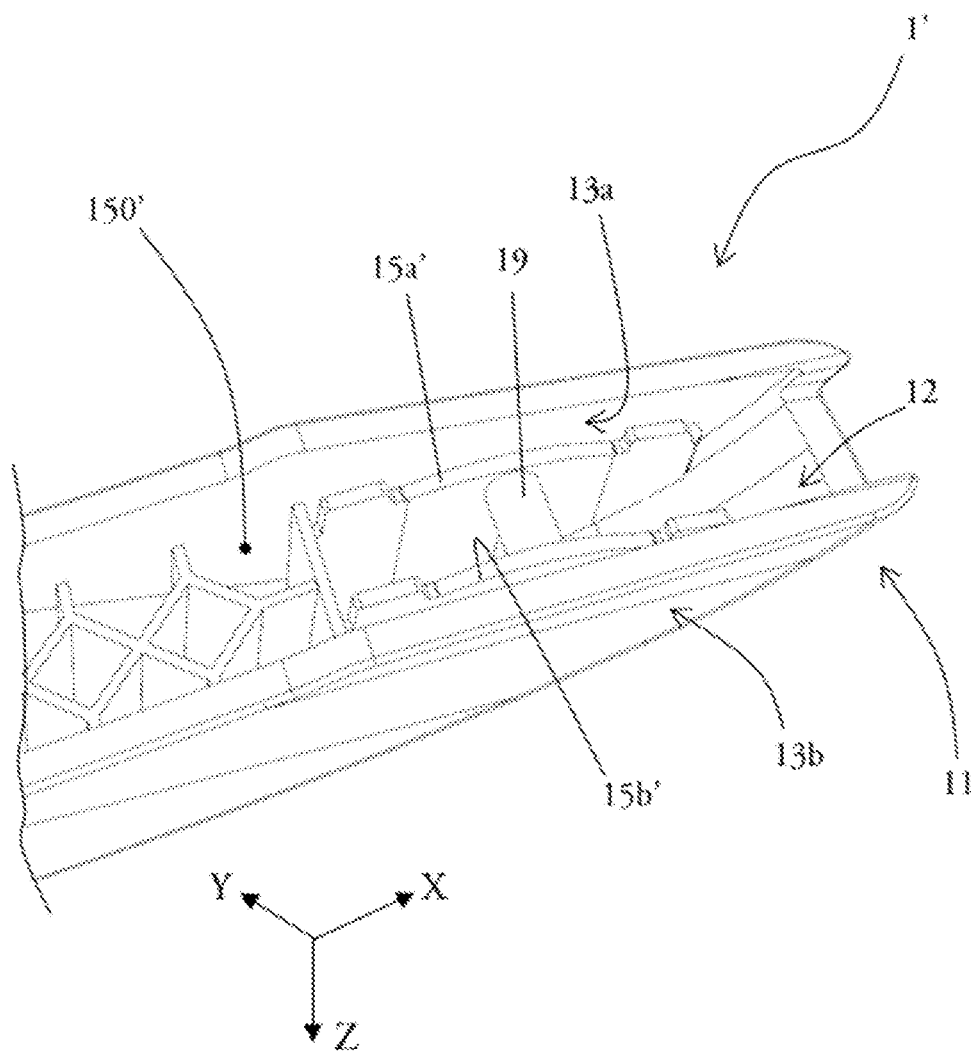

[fig 6]
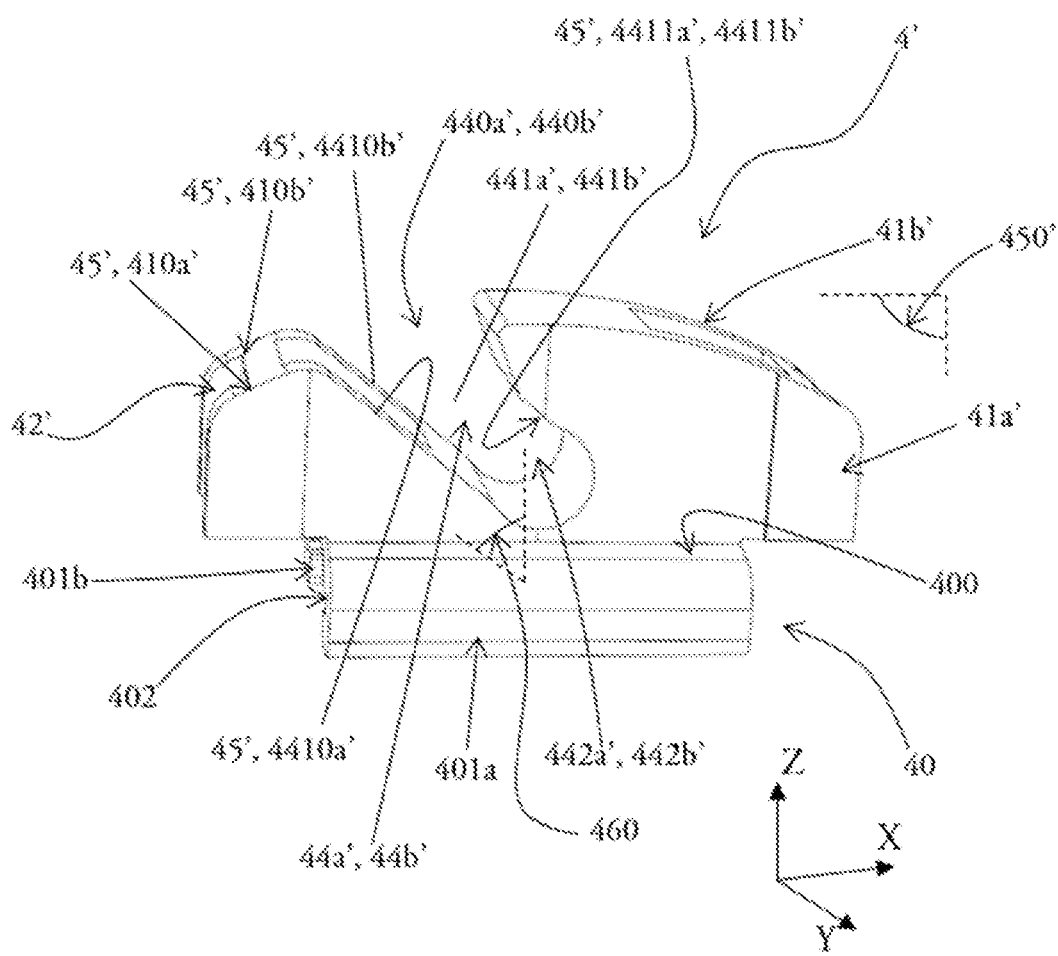

[fig 7]
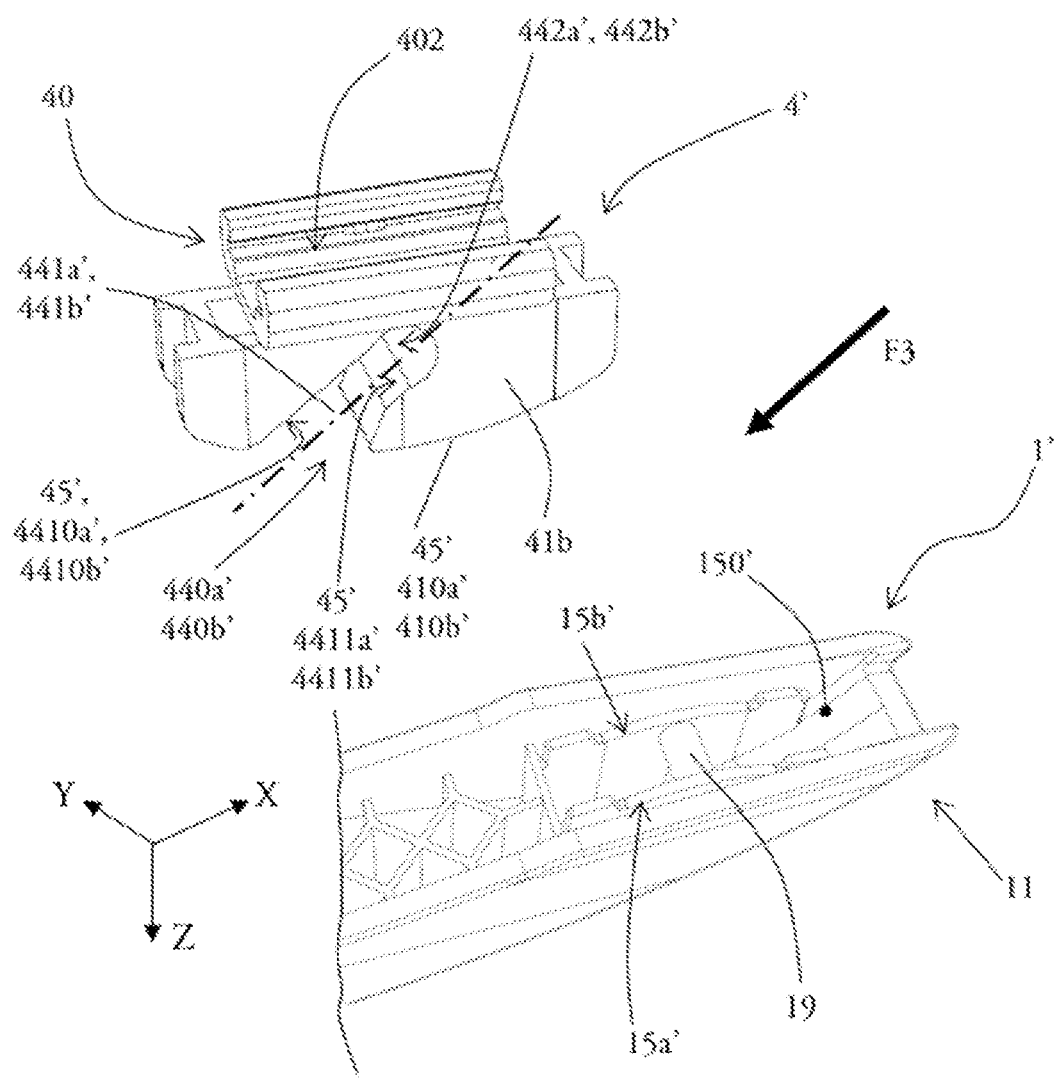

WIPER SYSTEM FOR A MOTOR VEHICLE

CROSS-REFERENCE TO RELATED APPLICATIONS

This application is filed under 35 U.S.C. § 371 U.S. National Phase of International Application No. PCT/EP2020/085374 filed Dec. 9, 2020 (published as WO2021130023), which claims priority benefit to French application No. 1915697 filed on Dec. 27, 2019, the disclosures of which are herein incorporated by reference in their entirety.

TECHNICAL FIELD

The invention relates to the field of wiping and/or cleaning the glazed surfaces of a motor vehicle, and relates more particularly to a wiper system for such an application.

BACKGROUND OF THE INVENTION

Wiper systems for motor vehicles are designed to remove liquids and dirt, which can disrupt the driver's view of his surroundings, by wiping. These wiper systems generally comprise at least one drive arm, which effects an angular back-and-forth movement against a glazed surface that is to be wiped/cleaned, and at least one wiper comprising a wiper blade rubber or blade rubber, made of an elastic material. The wiper and the drive arm are connected by a connecting assembly which notably comprises a connector securely fixed to the wiper. With certain configurations, an adapter connects the connector to the drive arm. The invention relates more particularly to wiper systems in which the connector is configured to be engaged directly in a terminal part of the drive arm so as to allow the wiper of the wiper system to be fixed detachably to the drive arm, while at the same time ensuring that, when driven by the movements of the wiper and of the arm, the blade rubber will rub against the glazed surface that is to be wiped/cleaned and wipe the water and a certain amount of dirt thereon, so that these can be removed from the field of view of the driver.

In such wiper systems, replacing the wiper, when the blade rubber it bears is excessively worn, is done by disengaging the connector, secured to the wiper, from the drive arm. To do this, the drive arm is generally moved, in a direction substantially perpendicular to that surface, away from the glazed surface it is intended to wipe/clean, and against which the wiper is pressed. Certain drive arms are configured to have a stable disengaged position allowing easy access to the abovementioned connector: such is notably the case, for example, with the drive arms of wiper systems intended to be pressed against a windshield at the front of a motor vehicle. In such instances, the user has both hands available for attaching the connector associated with the wiper to the drive arm and for performing the reverse operation of disengaging the connector from the drive arm. Moreover, in such configurations, the amplitude of the travel of the drive arm with respect to the glazed surface of the vehicle gives the user good visibility of the region of connection between the connector and the drive arm.

Other drive arms do not have a stable disengaged position: such is notably the case, for example, with wiper systems intended to wipe/clean the rear window of a motor vehicle. In such instances, assembling and dismantling the connector and, therefore, the wiper, to and from the drive arm, have to be performed in a small amount of space and with reduced visibility, or even with no visibility, of the connector and of the part thereof via which it is engaged with the drive arm. Moreover, in such configurations, the user has only one of their hands available for attaching the connector, secured to the wiper, to the drive arm, or for performing the reverse operation, as the other hand has to hold the drive arm away from the surface of the vehicle in order to provide access to the region of connection between the connector and the drive arm.

It is an object of the present invention to propose a simple and inexpensive solution for guaranteeing easy assembly of a connector secured to a wiper with a drive arm of a wiper system of a motor vehicle, regardless of the conditions of accessibility and of visibility of the region of connection between the connector and the drive arm. The solution proposed by the invention also aims to ensure that such an assembly maintains proper retention over time. In particular, such an assembly needs to be able to withstand the stresses applied to the drive arm and to the wiper, for example when the motor vehicle goes through an automatic washing system, which stresses may, in certain cases, cause the connector and the wiper to be torn from the drive arm.

BRIEF SUMMARY OF THE INVENTION

In order to achieve its objective, the subject matter of the invention, according to a first aspect, is a wiper system for a motor vehicle, comprising a drive arm and a wiper which are connected to one another by a connecting device which comprises a connector secured to the wiper and a connecting shaft, the drive arm comprising a first end via which it is attached to a drive means, and a second end, opposite to the first end in a longitudinal direction of the drive arm, the connecting device comprising a receiving housing for receiving the connecting shaft, the receiving housing comprising an entrance by means of which the connecting shaft is received in the receiving housing and a locking zone for locking this connecting shaft, characterized in that the locking zone is positioned between the entrance of the receiving housing and the second end of the drive arm.

Advantageously, the elements that make up the wiper system according to the invention, namely, in particular, the drive arm, the connector and the connecting shaft, are produced by injection-molding a plastics material in a mold.

The longitudinal direction of the drive arm here is the main direction of elongation thereof. By extension, in what follows, this direction will be referred to as the longitudinal direction of the wiper system according to the invention and of the elements of which it is composed. Perpendicular to this longitudinal direction is defined a vertical direction of the wiper system and of the elements of which it is composed which, in the wiper system according to the invention, corresponds to a direction of stacking of the drive arm and of the wiper. With reference to these directions and orientations, the terms "lower" and "bottom" refer, in what follows, to that part of the wiper system that is closest to the wiper in the vertical direction of the wiper system, and the terms "upper" and "top" refer, in what follows, to that part of the wiper system that is furthest from the wiper in the abovementioned vertical direction.

In a vehicle equipped with a wiper system according to the invention, the vertical direction of the wiper system is substantially perpendicular to the glazed surface against which the wiper is pressed, and the terms "bottom" or "lower" refer to that part of the wiper system that is in contact, in the above-defined vertical direction, with the glazed surface. With reference to the abovementioned longitudinal and vertical directions, the transverse direction of the wiper system according to the invention and of the elements of which it is composed is defined as being a direction perpendicular to both the above-defined longitudinal direction and vertical direction. The longitudinal, vertical and transverse directions of the wiper system also represent and, in what follows, will refer to the longitudinal, vertical and transverse directions of the components of the wiper system and, in particular, of the drive arm and its connector. It should be noted that the longitudinal, vertical and transverse directions of the wiper system according to the invention are independent of the orientation of this system in space or on a motor vehicle.

In addition to the above-defined directions and orientations, the first longitudinal end of the drive arm, by means of which this arm is attached to a drive means, will be arbitrarily referred to in what follows as being the rear end of the drive arm, and the opposite end of the drive arm, in the longitudinal direction of the wiper system according to the invention, will be referred to as being the front end of the drive arm. In the wiper system according to the invention, the drive arm is connected, at its rear end, to a drive means configured to impart to it an angular back-and-forth movement in a plane substantially parallel to a plane defined by the longitudinal and transverse directions of the wiper system. Driven, via the connector, by the angular back-and-forth movement of the drive arm, the blade rubber cleans, by wiping it, the glazed surface of a motor vehicle against which surface the wiper system is pressed.

In the wiper system according to the invention, the connecting shaft extends mainly in a direction substantially parallel to the above-defined transverse direction of the wiper system. Furthermore, according to the invention, the locking zone via which the connecting shaft is locked in its receiving housing is positioned, in the longitudinal direction of the wiper system according to the invention, between the entrance of the receiving housing, via which the connecting shaft is received in its receiving housing, and the above-defined front end of the drive arm. It then follows that, in the wiper system according to the invention, the operation of locking the connecting shaft in its receiving housing involves at least one movement of relative translation, in the longitudinal direction of the wiper system, of the connecting shaft and of the receiving housing, the one relative to the other.

According to a first embodiment of the invention, the connecting shaft is borne by the connector, the receiving housing being arranged in a receiving wall situated in an accommodating volume of the drive arm. According to this first embodiment, the connector is therefore received in the accommodating volume of the drive arm in order to connect the latter to the wiper of the wiper system according to the invention. The accommodating volume is delimited at least by two lateral flanks and an upper wall of the drive arm.

Specifically, and with reference to the above-defined directions and orientations, according to this first embodiment of the invention, the accommodating volume of the drive arm, in which volume the connector is received, is delimited by an upper wall of the drive arm, by two lateral flanks of the drive arm which extend substantially perpendicular to the aforementioned upper wall, from two longitudinal edges thereof, and by lower edges of these lateral walls. It must therefore be appreciated here that the lateral flanks of the drive arm are attached to the upper wall thereof via their upper longitudinal edges. In other words, the above-defined accommodating volume forms, in section on a plane defined by the vertical and transverse directions of the wiper system, a substantially inverted U-shape of which the horizontal branch is formed by the upper wall of the drive arm and of which the vertical branches are formed by the lateral flanks thereof. The accommodating volume of the drive arm is therefore open in its lower part, to accept the connector of the wiper system.

According to this first embodiment of the invention, the connecting shaft, which is for example substantially cylindrical with a circular cross section, extends in a direction substantially parallel to the transverse direction of the connector and of the wiper system. More specifically, the connecting shaft projects out from an upper upright of the connector substantially parallel to a vertical longitudinal plane of the wiper system and of the connector. Advantageously, the connecting shaft extends from the aforementioned upper upright transversely in the direction of the nearest lateral flank of the drive arm, in the transverse direction of the wiper system according to the invention.

The drive-arm wall in which the receiving housing is arranged, also referred to in what follows as the receiving wall, is a wall that is substantially flat and substantially parallel to an above-described lateral flank of the drive arm. With reference to the above-defined directions, the receiving wall therefore extends substantially parallel to a vertical longitudinal plane of the drive arm and of the wiper system according to the invention. More specifically, the receiving wall is arranged within the above-defined accommodating volume of the drive arm. More specifically still, within this accommodating volume, the receiving wall extends from the upper wall of the drive arm and is positioned some distance, in the transverse direction of the drive arm, from a lateral flank thereof. In one example, the aforementioned receiving wall and lateral flank are connected by one or more reinforcers which are perpendicular to these two elements.

In one example, the receiving wall comprises a lower edge which extends substantially in a plane defined by the lower edges of the lateral flanks of the drive arm. It must be appreciated here that the lower edge of the receiving wall is formed by the thickness thereof and that it extends, with reference to the above-defined directions and orientations, substantially parallel to a transverse longitudinal plane of the drive arm and of the wiper system according to the invention.

The receiving housing here forms a cutout in the receiving wall, which cutout opens into a rear edge of the receiving wall, which is to say, with reference to the above-defined directions and orientations, into that edge of this wall that is closest, in the longitudinal direction of the drive arm, to the first end, or rear end, of the latter. It must be appreciated here that the rear edge of the receiving wall is formed by the thickness thereof and that it extends, with reference to the above-defined directions and orientations, substantially parallel to a transverse vertical plane of the drive arm.

According to the invention, the opening via which the receiving housing opens into the rear edge of the receiving wall forms the entrance via which the connecting shaft enters the receiving housing, and is situated, in the vertical direction of the drive arm, on the one hand some distance from the above-defined lower edge of the receiving wall and, on the other hand, some distance from the upper wall of the drive arm. In other words, the receiving housing that receives the connecting shaft opens into the rear edge of the receiving wall between the lower edge of this wall and the upper wall of the drive arm, in the vertical direction of the latter.

The locking zone where the connecting shaft is locked in the aforementioned receiving housing extends in the longitudinal direction of the drive arm starting from the entrance of the receiving housing. In one example, the locking zone comprises, in the aforementioned longitudinal direction, a first part and a second part, also referred to in what follows as a terminal part. In such an example, the first part of the locking zone forms a substantially longitudinal window in the receiving wall, and one dimension of this window, measured in the vertical direction of the drive arm, is slightly less than a diameter of the connecting shaft. Moreover, in such an example, the second part of the locking zone has a shape and dimensions that substantially complement those of the connecting shaft. According to the invention, the second part of the locking zone is situated, in the longitudinal direction of the drive arm and of the wiper system, between the entrance of the receiving housing and the above-defined second end, or front end, of the drive arm.

According to the first embodiment mentioned hereinabove, the connector is inserted into the accommodating volume of the drive arm by engaging the connecting shaft in the entrance of the receiving housing, then by effecting a translational movement of the connecting shaft, in the longitudinal direction of the wiper system, in the receiving housing, toward the terminal part of the locking zone, namely in the direction of the front end of the drive arm. The connector is then immobilized in the receiving housing by locking the connecting shaft by snap-fastening into the terminal part of the locking zone. It should be noted that the configuration of the receiving housing and the nature of the plastics material used to make the drive arm means that, during the translational movement of the connecting shaft in the first part of the locking zone, the lower part of the receiving wall, which is comprised, in the vertical direction of the wiper system, between the receiving housing and the lower edge of the receiving wall, deforms under the effect of the elasticity of the plastics material of which the drive arm is made to facilitate the passage and sliding of the connecting shaft.

According to this embodiment, the respective configurations of the receiving housing and of the locking zone thereof also mean that the fitting and locking of the connector into the above-defined accommodating volume are performed by a relative translational movement, directed substantially in the longitudinal direction of the wiper system, of the connector with respect to the drive arm, this relative translational movement having a tendency to bring the connector closer to the above-defined front end of the drive arm.

According to various complementary features of the invention according to this first embodiment, which are considered separately or in combination:

The drive arm comprises two receiving walls arranged symmetrically one on each side of a longitudinal midplane of the drive arm, each of the receiving walls comprising a receiving housing for receiving the connecting shaft. In that case, the connecting shaft advantageously projects out from two substantially mutually parallel upper uprights of the connector which are arranged symmetrically with respect to a longitudinal midplane of the connector. The longitudinal midplane should be understood here, with reference to the above-defined directions and orientations, to mean a vertical longitudinal plane which passes through the middle of the connector in the above-defined transverse direction thereof. In such an example, the connecting shaft extends, in the transverse direction of the wiper system, on each side of the aforementioned two upper uprights of the connector, toward the lateral flanks of the drive arm. More specifically, in that case, the connecting shaft is made up of two portions which emerge transversely from the aforementioned upper uprights toward the lateral flanks of the drive arm. In various variants, the connecting shaft is of one piece, or comprises two parts of the same size, aligned in the transverse direction of the wiper system, and which form the aforementioned portions. Advantageously, according to such an example, one dimension, in the transverse direction of the wiper system, of the connecting shaft is slightly less than a transverse dimension of the drive arm, measured between those faces of the lateral flanks thereof that are situated inside the above-defined accommodating volume. This makes it possible, when the connector is in place in the aforementioned accommodating volume, for the longitudinal immobilization obtained by the configuration of the locking zone to be supplemented by transverse immobilization between the lateral flanks of the drive arm.

The drive arm comprises a guide member which comprises a main wall inclined toward the entrance of the receiving housing. The guide member extends to the rear, in the longitudinal direction, of a receiving wall such as previously defined. The guide member comprises a main wall substantially parallel to the receiving wall to the rear of which it extends. The main wall is directed in a direction of insertion of the connecting shaft into the receiving housing. With reference to the above-defined directions, the lower edge of this main wall, which edge is formed by the thickness of this wall, is inclined toward the entrance of the receiving housing. In other words, a dimension, measured in the vertical direction of the drive arm, of the main wall of the guide member decreases from the rear end toward the front end of the aforementioned main wall. More specifically, a dimension of the main wall of the guide member, measured from the upper wall of the drive arm, in the vertical direction of the latter, is less, at the front end of this main wall, than a distance, measured in the vertical direction of the drive arm, between the upper wall of the drive arm and a lower edge of the entrance of the receiving housing that receives the connecting shaft. Remember, with reference to the above-defined directions and orientations, that the front end of the main wall of the guide member is the end thereof that is closest, in the longitudinal direction of the drive arm, to the second end, or front end, of the latter. Similarly, the rear end of the main wall of the guide member is the end thereof that is closest, in the longitudinal direction of the drive arm, to the first end, or rear end, of the latter. The foregoing means that the inclined edge of the main wall of the guide member provides longitudinal guidance for the connecting shaft so that the latter can be directed toward the entrance of the receiving housing. In a configuration in which the drive arm has no stable disengaged position and in which the connector (which is to say also the wiper to which the connector is secured) is to be assembled with the drive arm without direct visibility of the zone of collaboration between the connector and the drive arm, this longitudinal guidance offers an appreciable advantage in terms of ease of assembly.

The guide member comprises a bearing wall for the connecting shaft to bear against. More specifically, the guide member comprises a transverse wall which extends, from the front end of the above-described main wall, substantially perpendicular to the latter, bearing against the lateral flank of the drive arm that is closest, in the transverse direction of the drive arm, to the aforementioned main wall.

Advantageously, one dimension, measured in the vertical direction of the drive arm, of the transverse wall of the guide member, is substantially equal to a dimension, measured in the vertical direction of the drive arm, of the main wall of the guide member at the front end thereof. The configurations of the guide member and of the receiving housing mean that this transverse wall completes the abovementioned longitudinal guidance provided by the inclined edge of the main wall of the guide member by forming a bearing surface that the connecting shaft can bear against. Such contact notably ensures correct positioning of the connecting shaft with respect to the entrance of the receiving housing so that it can be engaged within same.

The drive arm comprises a low wall for immobilizing the connector. With reference to the above-defined directions and orientations, this low wall extends in a substantially vertical longitudinal plane of the drive arm and is positioned substantially midway along the transverse direction thereof. The low wall is configured to become inserted between the above-described upper uprights of the connector. In this way, the low wall provides transverse immobilization of the connector in the accommodating volume of the drive arm, thus limiting the lateral rocking movements of the wiper with respect to the drive arm.

According to a second embodiment of the invention, the connecting shaft extends between two lateral flanks of the drive arm, the receiving housing that receives the connecting shaft being arranged in the connector.

In a first variant, the connecting shaft here extends transversely from the lateral flanks of the drive arm, bearing against each of them. Alternatively, the connecting shaft is arranged starting from lateral walls of the drive arm that are substantially parallel to the lateral flanks thereof and are arranged inside the above-defined accommodating volume.

According to the second aforementioned embodiment of the invention, the receiving housing is arranged in an above-defined upper upright of the connector. With reference to the above-defined directions and orientations, the entrance of the receiving housing here opens into an upper edge of the upper upright concerned, which is to say, in the wiper system according to the invention, into the edge of the upper upright of the connector that is closest to the above-defined upper wall of the drive arm.

Starting from its entrance, the receiving housing here, in the wiper system according to the invention, extends toward the bottom and toward the front of the wiper system, which is to say, with reference to the above-defined directions and orientations, on the one hand, in the vertical direction of the wiper system, toward the opening of the accommodating volume of the drive arm in which the connector is received and, on the other hand, in the longitudinal direction of the wiper system, toward the front thereof, namely toward the above-defined second end, or front end, of the drive arm.

In a similar way to the above-described first embodiment, the locking zone for the locking of the connecting shaft comprises a second part, or terminal part, the shapes and dimensions of which substantially complement those of the connecting shaft, and a first part which extends, in the above-defined longitudinal direction, between the entrance of the receiving housing and the second part of the locking zone. In a similar way to the above-described first embodiment, the engagement and immobilization of the connecting shaft in the receiving housing are achieved, on the one hand, by relative translational movement of the connector with respect to the drive arm bearing the connecting shaft and, on the other hand, by locking the connecting shaft in the second part of the locking zone by snap-fastening.

The foregoing means that, in the wiper system according to this second embodiment of the invention, the first part of the locking zone of the receiving housing is inclined, in the vertical direction of the drive arm, toward the lower part of the latter and, in the longitudinal direction of the drive arm, toward the front end of the latter.

According to the aforementioned second embodiment of the invention, the receiving housing that receives the connecting shaft comprises at least one guide wall for guiding the connecting shaft into the receiving housing. More specifically, and with reference to the foregoing, this guide wall comprises a lower edge of the first part of the locking zone, which is to say the edge thereof that is closest, in the vertical direction of the wiper system, to the wiper to which the connector is secured. The foregoing means that the aforementioned lower edge is inclined in a direction of insertion of the connecting shaft into the receiving housing.

In the second embodiment of the invention which has just been described, the connector is mounted and immobilized in the accommodating volume of the drive arm, as follows. The connector is first of all engaged in the lower opening of the accommodating volume of the drive arm such that the second part of the locking zone of the receiving housing is situated, in the longitudinal direction of the drive arm, on the side of the front end thereof.

The connector is then moved relative to the drive arm, in a longitudinal translational movement directed toward the first end, or rear end, of the drive arm, until the connecting shaft borne by the drive arm engages in the entrance of the receiving housing arranged in the connector. The relative translational movement continues until the connecting shaft is locked, in the longitudinal direction, by snap-fastening into the second part of the locking zone of the receiving housing. In these engagement and relative-translational movements, the connector is guided with respect to the connecting shaft, first of all by the upper edge of the upper upright of the connector into which edge the receiving housing opens, and then by the above-defined lower edge of the first part of the locking zone. The upper edge of the upper upright of the connector, into which edge the receiving housing opens, and the lower edge of the first part of the locking zone therefore together form a guide member guiding the connecting shaft with respect to the receiving housing when these two elements are being assembled and/or dismantled.

Whatever the configuration chosen, the locking of the connecting shaft by snap-fastening into the second part of the locking zone results in longitudinal immobilization and vertical immobilization of the connector with respect to the drive arm while at the same time leaving the connecting shaft free to rotate with respect to the drive arm, about an axis parallel to the transverse direction of the wiper system, which rotation allows the wiper relative movements with respect to the drive arm in the wiper system according to the invention.

Furthermore, whatever the configuration chosen, the invention allows easy fitting of a connector of a wiper system in the accommodating volume of a drive arm of the wiper system, without the need for the zone of connection between these two elements to be visible. The invention is therefore particularly beneficial to, and therefore according to a second aspect extends to cover, a wiper system in which the drive arm has no stable disengaged position. Remember that in such a wiper system, the user has only one of their hands available for attaching the connector, secured to the wiper, to the drive arm, or for performing the reverse operation, as the other hand has to hold the drive arm away from the glazed surface of the vehicle in order to provide access to the zone of connection between the connector and the drive arm.

More specifically, the invention finds a particularly advantageous application in such a wiper system in which the amplitude of a travel of the drive arm perpendicular to a glazed surface against which the wiper system is pressed. For example, a maximum angular travel of the drive arm of the wiper system according to the invention with respect to a glazed surface of a vehicle is less than around 10°, which is notably the case of a wiper system intended to be associated with a glazed rear surface of a vehicle.

The invention finally, according to a third aspect, extends to a method for dismantling the wiper from the drive arm of a wiper system as described hereinabove, which involves a step of relative translational movement of the connecting shaft with respect to the receiving housing along a guide member of the wiper system. Advantageously, the translational movement is performed in a plane which includes the longitudinal direction of the drive arm.

According to the above-described first embodiment of the invention, the relative translational movement of the connecting shaft with respect to the receiving housing has the effect of moving the connector away from the first end, or rear end, of the drive arm, via which end this arm is connected to a drive means. According to the above-described second embodiment of the invention, the relative translational movement of the connecting shaft with respect to the receiving housing has the effect of moving the connector closer to the first end, or rear end, of the drive arm, via which end this arm is connected to a drive means.

BRIEF DESCRIPTION OF THE DRAWINGS

Other features, details and advantages of the invention will become more clearly apparent with the aid of the following description and of the drawings, in which:

FIG. 1 is a schematic perspective overview of a wiper system according to the invention, FIG. 2 is a schematic perspective view of the connector of a wiper system according to a first embodiment of the invention, FIG. 3 is a schematic perspective view of the drive arm of a wiper system according to a first embodiment of the invention, FIG. 4 schematically illustrates the assembly of the connector and of the drive arm according to the first embodiment of the invention illustrated by FIGS. 2 and 3, FIG. 5 is a schematic perspective view of the drive arm of a wiper system according to a second embodiment of the invention, FIG. 6 is a schematic perspective view of the connector of a wiper system according to a second embodiment of the invention, FIG. 7 schematically illustrates the assembly of the connector and of the drive arm according to the second embodiment of the invention illustrated by FIGS. 5 and 6.

It should first of all be noted that although the figures set out the invention in detail for implementing the invention, said figures may be used in order better to define the invention if necessary. It should also be noted that, in all of the figures, elements that are similar and/or perform the same function are indicated by the same reference.

DETAILED DESCRIPTION OF THE INVENTION

It should first of all be noted that although the figures set out the invention in detail for implementing the invention, said figures may be used in order better to define the invention if necessary. It should also be noted that, in all of the figures, elements that are similar and/or perform the same function are indicated by the same reference.

With reference to FIG. 1, a wiper system 100 intended for a motor vehicle notably comprises a drive arm 1 configured to perform an angular back-and-forth movement against a glazed surface, not depicted, of the vehicle. The drive arm 1 has an elongate shape in a main direction of extension, which is also referred to in what follows as the longitudinal direction (X) of the drive arm 1 and of the wiper system 100. At one of its ends 10, in its longitudinal direction, and arbitrarily referred to in what follows as the first end, or rear end 10, the drive arm 1 is connected to a drive device 2 configured to impart the aforementioned angular back-and-forth movement to it. The drive device 2 comprises, for example, an electric motor.

At its opposite end 11, in its longitudinal direction (X), and arbitrarily referred to in what follows as the second end, or front end 11, the drive arm 1 is connected to a wiper 3 by a connecting device 200 which is not detailed in FIG. 1. The wiper 3 has in particular a blade rubber 30, which is shown schematically in FIG. 1, and is made of a flexible material. Driven in an angular back-and-forth movement against a glazed surface of the vehicle, the drive arm 1 in turn drives the wiper 3 and its blade rubber 30 which, under the effect of this movement, rubs the glazed surface and removes from it any dust and dirt that may interfere with the view that the driver of the vehicle has of their surroundings.

The connecting device 200 notably comprises a connector 4, not visible in FIG. 1, secured to the wiper 3 and connected to the drive arm 1 in such a way as notably to allow relative rotation of the wiper 3 with respect to the drive arm 1 about a transverse axis (Y) perpendicular to the above-defined longitudinal direction (X).

The transverse axis (Y) about which the wiper 3 is able to rotate with respect to the drive arm 1 also represents the transverse direction (Y) of the wiper system 100. With reference to the longitudinal direction (X) and to the aforementioned transverse direction (Y) there is also defined a vertical direction of the wiper system 100, which represents a direction of stacking of the wiper 3 and of the drive arm 1 in the wiper system 100. The vertical direction of the wiper system 100 is represented by the direction of an axis (Z), the frame of reference (X, Y, Z) forming a direct trihedron. With respect to this trihedron system, the terms "top" or "upper" will be represented by the positive direction of the axis (Z), the terms "bottom" or "lower" being represented by the negative direction of this same axis (Z). More specifically, in the wiper system 100 according to the invention, the terms "top" or "upper" will, in what follows, refer to elements situated on the side of the drive arm 1 in the aforementioned vertical direction (Z), and the terms "bottom" or "lower" will, in what follows, refer to elements situated on the side of the blade rubber 30 in the vertical direction (Z). It should be noted that the directions thus defined are not connected with the directions and orientations of a vehicle equipped with these elements. In other words, the longitudinal direction (X), transverse direction (Y) and vertical direction (Z) may have any orientation whatsoever with respect to the longitudinal direction, transverse direction T and vertical direction V of a motor vehicle equipped with a wiper system according to the invention. The longitudinal direction (X), transverse direction (Y) and vertical direction (Z) of the wiper system 100 also represent and, in what follows, indifferently refer to, the longitudinal, transverse and vertical directions of the components of the wiper system 100 and, in particular, of the drive arm 1 and of the connector 4.

FIG. 2 schematically illustrates, in perspective, a connector 4 of a wiper system 100 like the one illustrated in FIG. 1, according to a first embodiment of the invention.

With reference to that figure, the connector 4 comprises a base 40 and two upper uprights 41a, 41b which extend, from the base 40, toward the top of the connector in the vertical direction (Z) of the latter and with reference to the above-defined directions and orientations. The base 40 of the connector 4 comprises an upper wall 400 which extends substantially in a transverse longitudinal plane, and two lateral walls 401a, 401b, which extend, from the upper wall 400, substantially perpendicular thereto, toward the bottom in the aforementioned vertical direction (Z) and with reference to the above-defined directions and orientations. The upper wall 400 and lateral walls 401a, 401b together delimit a channel 402 configured to receive the aforementioned wiper 3, not depicted in FIG. 2. With reference to the above-defined directions and orientations, the channel 402 is therefore open in its lower part to receive the wiper 3.

The upper uprights 41a, 41b of the connector 4, which are substantially flat and mutually parallel, extend substantially parallel to a vertical longitudinal plane defined by the above-described directions (X, Z). More specifically, according to the example more particularly illustrated in FIG. 2, the upper uprights 41a, 41b extend substantially symmetrically one on each side of a vertical longitudinal midplane 450 that passes through the middle, in the transverse direction (Y), of the upper wall 400 of the base 40 of the connector 4. The lateral uprights 41a, 41b between them delimit a longitudinal slot 42 which runs parallel to the aforementioned vertical longitudinal midplane 450.

In a substantially middle position in the longitudinal direction (X), the upper uprights 41a, 41b of the connector 4 each comprise a substantially cylindrical portion 43a, 43b, respectively, of which the axis is substantially parallel to the transverse direction (Y) of the connector 4. Each portion 43a, 43b projects transversely out from an upper upright 41a, 41b in the opposite direction to the above-described transverse slot 42. Only the portion 43a is visible in FIG. 2.

According to one example, the portions 43a, 43b are identical and their axes are aligned. Alternatively, the portions 43a, 43b may be joined within the transverse slot 42 to form a single transverse shaft.

FIG. 3 schematically illustrates, in perspective, the drive arm 1 of a wiper system 100 like the one illustrated in FIG. 1, according to a first embodiment of the invention. The drive arm 1 as illustrated in FIG. 3 is therefore configured to receive a connector 4 like the one illustrated in FIG. 2. FIG. 3 more particularly illustrates the second end 11, or front end, of such a drive arm 1. More specifically, FIG. 3 shows the front end 11 of the drive arm 1, viewed from the side of the lower part thereof, namely, with reference to the above-defined directions and orientations, from the side via which the wiper 3 is attached to the drive arm 1 in the wiper system 100.

With reference to FIG. 3, the drive arm 1 comprises an upper wall 12 of substantially longitudinal and transverse extent, from the longitudinal edges of which there extend two lateral flanks 13a, 13b of substantially longitudinal and vertical extent, which are substantially perpendicular to the upper wall 12. The upper wall 12 and the lateral flanks 13a, 13b together delimit an accommodating volume 150 notably configured to receive a connector 4 as described hereinabove and illustrated in FIG. 2. More specifically, the accommodating volume 150 comprises an opening 151 notably configured for allowing the insertion of the connector 4 into the accommodating volume 150. With reference to the above-defined directions and orientations, the opening 151 is arranged in the lower part of the accommodating volume 150, which is to say in that part of this volume that is intended to be closest, in the above-defined vertical direction (Z), to the wiper 3 in the wiper system 100. According to the example more particularly illustrated in FIG. 3, the opening 151 is delimited by a lower edge 120 of the upper wall 12 and by lower edges, 130a, 130b, respectively, of the lateral flanks 13a, 13b, of the drive arm 1.

According to the invention, the drive arm 1 comprises, arranged within the accommodating volume 150, a receiving wall 14 which extends from the upper wall 12, substantially parallel to a lateral flank 13a, 13b, of the drive arm 1, some distance therefrom in the transverse direction (Y) of the drive arm 1. In the example more particularly illustrated in FIG. 3, the drive arm 1 comprises two lateral walls 14a, 14b which are mutually parallel and arranged symmetrically one on each side of a vertical longitudinal midplane 155 of the drive arm 1, which plane is defined by the above-defined directions (X, Z) and passes through the middle, in the transverse direction (Y), of the upper wall 12. As shown in FIG. 3, each receiving wall 14a, 14b is attached to a respective lateral flank 13a, 13b of the drive arm 1 by at least one rib 140a, 140b substantially perpendicular to the receiving wall 14a, 14b concerned. More specifically, the ribs 140a, 140b extend between a receiving wall 14a, 14b and that lateral flank 13a, 13b of the drive arm 1 that is closest to this wall in the transverse direction (Y).

Each receiving wall 14a, 14b has a cutout 16a, 16b, respectively, forming a receiving housing to receive a portion 43a, 43b of the above-described connector 4. It must therefore be appreciated that, according to the example more particularly illustrated in FIGS. 2 and 3, each portion 43a, 43b of the connector 4 forms a connecting shaft connecting the connector 4 to the drive arm 1.

The receiving housing 16a, 16b comprises an entrance 160a, 160b via which it opens into a rear vertical edge 141a, 141b of the receiving wall 14a, 14b. The rear vertical edge 141a, 141b must be understood here to mean the edge of the relevant wall that is furthest from the front end 11 of the drive arm 1 in the longitudinal direction (X) of this arm. More specifically, and as shown in FIG. 3, the entrance 160a, 160b of the receiving housing 16a, 16b is arranged at a distance, in the vertical direction (Z) of the drive arm 1, from a lower edge 142a, 142b of the receiving wall 14a, 14b and from the upper wall 12. Advantageously, the lower edges 142a, 142b of the receiving walls 14a, 14b, and the lower edges 130a, 130b of the lateral flanks 13a, 13b are substantially coplanar. Advantageously, one dimension, measured in the vertical direction (Z) of the entrance 160a, 160b, is substantially equal to a diameter of a portion 43a, 43b forming a connecting shaft.

Starting from the entrance 160a, 160b, the receiving housing 16a, 16b extends, in the longitudinal direction (X) of the drive arm 1, toward the front end 11 of this arm.

More specifically, the receiving housing 16a, 16b comprises, starting from its entrance 160a, 160b, and working successively toward the front end 11 of the drive arm 1, a first part 161a, 161b and a second part 162a, 162b or terminal part which are substantially aligned in the longitudinal direction (X). The first part 161b and the second part 162b of the receiving housing 16b are not visible in FIG. 3.

According to the invention, one dimension, measured in the vertical direction (Z) of the first part 161a, 161b, is slightly smaller than a diameter of a portion 43a, 43b of the connector 4. Furthermore, the invention provides for the shapes and dimensions of the aforementioned terminal part 162a, 162b to substantially complement those of a portion 43a, 43b of the connector 4. The first part 161a, 161b and the second part 162a, 162b together form a locking zone for locking the connector 4 to the drive arm 1.

According to the invention, the drive arm 1 also comprises, arranged within the accommodating volume 150, a guide member. According to the example more particularly illustrated in FIGS. 2 and 3, the drive arm 1 comprises two guide members 17a, 17b, arranged symmetrically one on each side of the above-defined vertical longitudinal midplane 155.

With reference to the above-defined orientations and naming conventions, each guide member 17a, 17b extends, in the longitudinal direction (X) of the drive arm 1, to the rear of a receiving wall 14a, 14b. In other words, each receiving wall 14a, 14b is situated, in the longitudinal direction (X) of the drive arm 1 and of the wiper system 100, between the front end 11 of the drive arm 1 and a corresponding guide member 17a, 17b.

Each guide member 17a, 17b extends, in the longitudinal direction (X) of the drive arm 1, in the continuation of a receiving wall 14a, 14b, and comprises a main wall 170a, 170b substantially parallel to the lateral flank 13a, 13b to which, in the transverse direction (Y), it is closest. More specifically, the main wall 170a, 170b of the guide member 17a, 17b is substantially aligned, in the longitudinal direction (X) of the drive arm 1, with the corresponding receiving wall 14a, 14b.

According to the invention, one dimension, measured in the vertical direction (Z) of the drive arm 1, at a front end of the main wall 170a, 170b, is less than a dimension, measured in the vertical direction (Z) of the drive arm 1, at a rear end of the main wall 170a, 170b. In other words, the main wall 170a, 170b of the guide member 17a, 17b is inclined, in the longitudinal direction (X) of the drive arm 1, toward the receiving wall 14a, 14b, in the continuation of which the guide member 17a, 17b concerned extends, in the longitudinal direction. Remember, with reference to the above-defined directions and orientations, that the front end of the main wall 170a, 170b is, in the longitudinal direction (X) of the drive arm 1, that end of this wall that is closest to the above-defined front end 11 of the drive arm 1. Similarly, the rear end of the main wall 170a, 170b is, in the longitudinal direction (X) of the drive arm 1, that end of this wall that is furthest from the front end 11 of the drive arm 1.

The guide member 17a, 17b also comprises a bearing wall 171a, 171b substantially perpendicular to the main wall 170a, 170b of the guide member 17a, 17b. More specifically, the bearing wall 171a, 171b extends at the front end of the main wall 170a, 170b between the latter and that lateral flank 13a, 13b of the drive arm 1 that is closest in the transverse direction (Y). As shown by FIG. 3, the bearing wall 171a, 171b is substantially perpendicular to the main wall 170a, 170b and to the lateral flank 13a, 13b between which wall and flank it extends.

According to the example more particularly illustrated in FIGS. 2 and 3, the drive arm 1 also comprises a substantially vertical longitudinal low wall 18 which extends substantially in the middle of the drive arm 1 in the transverse direction (Y) thereof. In other words, the low wall 18 extends substantially in the above-defined vertical longitudinal midplane 155. The low wall 18 extends from the upper wall 12 of the drive arm. Furthermore, in the longitudinal direction, the low wall 18 extends substantially between a rear end of the main wall 170a, 170b of the guide member 17a, 17b and a front end of the receiving wall 14a, 14b. Advantageously, one dimension of the low wall 18, measured in the transverse direction (Y) of the drive arm 1, is slightly smaller than a dimension, measured in the transverse direction (Y) of the connector 4 and of the wiper system 100, of the above-described slot 42 of the connector 4 as illustrated in FIG. 2, so that, in the wiper system 100, the low wall 18 of the drive arm 1 can be received in the longitudinal slot 42 of the connector 4, between the upper uprights 41a, 41b thereof.

FIG. 4 illustrates the assembly of a connector 4 like the one described hereinabove and illustrated in FIG. 2 with a drive arm 1 like the one described hereinabove and illustrated in FIG. 3. With reference to the above-defined orientations and naming conventions, this figure more specifically shows the front end 11 of the drive arm 1, viewed from beneath, which is to say viewed from the side, in the vertical direction (Z) of the drive arm 1 and of the wiper system 100, by which the above-defined accommodating volume 150 of the drive arm 1 is open to receive the connector 4. FIG. 4 also shows the connector 4 in its position in which it is assembled with the drive arm 1 and more specifically with the front end 11 thereof. In other words, FIG. 4 shows the drive arm 1 and the connector 4 in their relative positions of being attached to one another in the wiper system 100 according to the invention.

FIG. 4 again shows the connector 4, with its base 40, its upper uprights 41a, 41b and its portions 43a, 43b forming a connecting shaft. Only the portion 43b is visible in FIG. 4. This figure also again shows the above-defined slot 402, configured to receive a wiper 3 of the wiper system 100 comprising the drive arm 1 and the connector 4. The wiper 3 to which the connector 4 is secured is not depicted in FIG. 4.

FIG. 4 also again shows the front end 11 of the drive arm 1, the above-defined accommodating volume 150, the above-described opening 151 thereof as well as, in particular, the receiving walls 14a, 14b, the receiving housings 16a, 16b, the guide members 17a, 17b and the low wall 18, which are as described above.

The connector 4 secured to a wiper 3 is attached to the drive arm 1 first of all by inserting, in the vertical direction (Z) of the wiper system 100, the upper part of the upper uprights 41a, 41b, in which upper part the portions 43a, 43b are arranged, into the opening 151 of the accommodating volume 150 of the drive arm 1. The direction of insertion of the upper part of the upper uprights 41a, 41b of the connector 4 into the accommodating volume 150 of the drive arm 1 is indicated by the arrow F1 in FIG. 4. More specifically, this insertion is performed in such a way that the portions 43a, 43b of the connector 4 come to bear against the thickness of the main wall 170a, 170b of the corresponding guide member 17a, 17b, namely against the lower edge of the aforementioned main wall 170a, 170b.

The attaching of the connector 4 to the drive arm 1 continues with a relative translational movement of the connector 4 with respect to the drive arm 1 in a substantially longitudinal direction indicated by the arrow F2 in FIG. 4, namely in a movement that tends to move the connector 4 closer to the terminal part of the front end 11 of the drive arm 1. In this movement, the portions 43a, 43b of the connector 4 are guided by the inclination of the main wall 170a, 170b of the corresponding guide member 17a, 17b as far as the above-described bearing wall 171a, 171b. The above-described configuration and dimensions of the drive arm 1 mean that as the relative translational movement of the connector 4 with respect to the drive arm 1 in the direction illustrated by the arrow F2 continues, the portions 43a, 43b each engage in the entrance 160a, 160b of a receiving housing 16a, 16b.

The connector 4 is then immobilized relative to the drive arm 1 by continuing the relative translational movement of the connector 4 with respect to the drive arm 1 in the direction indicated by the arrow F2. In this movement, the portions 43a, 43b are first of all guided along the first part 161a, 161b of the receiving housings 16a, 16b, then they lock by snap-fastening into the terminal part 162a, 162b of the aforementioned receiving housings 16a, 16b. In this position, the connector 4 is immobilized relative to the drive arm 1 in the longitudinal direction (X) and in the vertical direction (Z) of this arm and of the wiper system 100. The movements of relative rotation of the connector 4 with respect to the drive arm 1 about the axis of the portions 43a, 43b remain possible, thus allowing the wiper 3 secured to the connector 4 to remain pressed against a glazed surface, of complex shape, of a motor vehicle.

Furthermore, it should be noted that the respective configurations of the connector 4 and of the front end 11 of the drive arm 1 mean that, in the abovementioned translational movements, the low wall 18 of the drive arm 1 becomes inserted between the upper uprights 41a, 41b of the connector 4 thus reducing the risks of rocking transverse movements of the wiper 3 secured to the connector 4 with respect to the drive arm 1.

The invention thus allows the connector 4 to be fitted and locked to the front end 11 of the drive arm 1 in a simple way. It should be remembered here that, when the wiper system 100 is installed on a motor vehicle, the drive arm 1, when replacing the wiper 3, is moved away from the glazed surface against which the wiper system 100 is placed, in a direction substantially perpendicular to the aforementioned glazed surface, namely, as indicated hereinabove, in a direction substantially parallel to the vertical direction (Z) of the wiper system 100. The foregoing means that, with reference to the above-defined directions and orientations, the connector 4 is inserted into the accommodating volume 150 from under the drive arm 1.

From this perspective, it should be noted that, in particular, the inclination of the main wall 170a, 170b of the guide member 17a, 17b, as well as the presence of the bearing wall 171a, 171b, allow the portions 43a, 43b of the connector 4, that form the connecting shaft, to be guided as far as the receiving housings 16a, 16b of the drive arm 1. This guidance allows and facilitates the fitting and locking of the connector 4 with respect to the drive arm 1 in configurations in which the travel of the drive arm 1 with respect to the glazed surface of the vehicle is small, namely in situations in which the user has only reduced visibility, or even no visibility at all, of the above-defined accommodating volume 150 and of the elements of which it is composed. This guidance additionally facilitates the attachment and detachment of the connector 4 with respect to the drive arm 1 in configurations mentioned hereinabove in which the user has to perform these operations using just one hand, the other hand having to hold the drive arm 1 away from the glazed surface of the vehicle. This makes the invention particularly attractive in the context of applying it, nonexclusively, to a wiper system intended to equip a rear window of a vehicle.

FIGS. 5 and 6 respectively illustrate a drive arm 1' and a connector 4' according to a second embodiment of a wiper system 100 according to the invention. In this second embodiment, the connecting shaft is borne by the drive arm 1', and the receiving housing configured to receive the connecting shaft is arranged in the connector 4'.

FIG. 5 illustrates a drive arm 1' according to this second embodiment of the invention.

In a similar way to the drive arm 1 illustrated in FIG. 3, the drive arm 1' comprises an upper wall 12 and two lateral flanks 13a, 13b which together delimit an interior volume 150' of the drive arm 1', of which the shape is substantially that of an inverted U of which the lower branch is formed by the upper wall 12 of the drive arm V.

According to the example more particularly illustrated in FIG. 5, the drive arm 1' comprises, arranged within the aforementioned interior volume 150', two walls, respectively 15a' and 15b', also referred to in what follows as connecting walls 15a', 15b', which are substantially parallel to one another and to the abovementioned lateral flanks 13a, 13b. More specifically, each connecting wall 15a', 15b' extends some distance, in the transverse direction (Y) of the drive arm 1', from the lateral flank 13a, 13b to which, in the aforementioned transverse direction (Y), it is closest. According to one example, each connecting wall 15a', 15b' is connected to the lateral flank 13a, 13b to which it is transversely closest, by one or more reinforcers which are substantially perpendicular to these two elements.

According to the example more particularly illustrated in FIG. 5, a connecting shaft 19 extends, in the transverse direction (Y) of the drive arm 1', between the above-defined connecting walls 15a', 15b'. The foregoing means that the connecting shaft 19 is substantially perpendicular to the aforementioned connecting walls 15a', 15b'. According to an alternative example, the connecting shaft 19 may extend between the aforementioned lateral flanks 13a, 13b.

FIG. 6 more particularly illustrates a connector 4' configured to cooperate with a drive arm 1' like the one illustrated in FIG. 5, according to the aforementioned second embodiment of the invention. In a similar way to the connector 4 illustrated in FIG. 2 for a first embodiment of the invention, the connector 4' again has the base 40 formed of an above-described upper wall 400 and the two lateral walls 401a, 401b, which together delimit a slot 402 configured to receive a wiper 3 of the wiper system 100, not depicted in FIG. 6.

There are also, once again, and which, with reference to the above-defined directions and orientations, extend vertically toward the top from the upper wall 400, two upper uprights 41a', 41b', substantially parallel to one another and parallel to a vertical longitudinal plane of the wiper system 100. More specifically, according to the example more particularly illustrated in FIG. 6, the upper uprights 41a', 41b' extend substantially symmetrically one on each side of a vertical longitudinal midplane 450' that passes through the middle, in the transverse direction (Y) of the connector 4', of the upper wall 400. The upper uprights 41a', 41b' between them delimit a longitudinal slot 42' substantially parallel to the vertical longitudinal midplane 450'.

According to the example more particularly illustrated in FIG. 6, each upper upright 41a', 41b' comprises a cutout 44a', 44b' forming a housing to receive the above-described connecting shaft 19 borne by the drive arm F. More specifically, with reference to the above-defined directions and orientations, each cutout 44a', 44b' extends from an upper edge 410a', 410b' of an upper upright 41a', 41b' in a direction combined between the longitudinal direction (X) and the vertical direction (Z) of the connector 4'. In other words, each cutout 44a', 44b' is inclined, in the corresponding upper upright 41a', 41b', in the direction of the upper wall 400 of the base 40, making a nonzero angle 460 with the vertical direction (Z) of the connector 4'.

Each cutout 44a', 44b' opens into the upper edge 410a', 410b' to form an entrance 440a', 440b' of the corresponding receiving housing 44a', 44b'. Furthermore, as shown in FIG. 6, each cutout 44a', 44b' comprises, at the opposite end to its entrance 440a', 440b', in its main direction of extension, a terminal part 442a', 442b' of which the shapes and dimensions substantially complement those of the aforementioned connecting shaft 19. According to the example more particularly illustrated in FIGS. 5 and 6, the terminal part 442a', 442b' of each receiving housing 44a', 44b' constitutes a snap-fastening locking zone for the connecting shaft 19 borne by the aforementioned drive arm 1'.

Between the entrance 440a', 440b' and the terminal part 442a', 442b', each cutout 44a', 44b' comprises an intermediate part 441a', 441b' the shape and size of which are defined to allow the aforementioned connecting shaft 19 borne by the drive arm 1' to slide.

FIG. 7 illustrates the assembly of a connector 4' like the one illustrated in FIG. 6 with a drive arm 1' like the one illustrated in FIG. 5, in a wiper system 100 according to the invention. With reference to the above-defined directions and orientations, the connector 4' and the drive arm 1' are shown, in FIG. 7, viewed from beneath.

The connector 4', secured to a wiper 3 which has not been depicted in FIG. 7, is attached to the drive arm 1' by engaging the connecting shaft 19 in the entrances 440a', 440b' of the receiving housings 44a', 44b', and then by relative sliding of the connector 4' with respect to the drive arm 1' in a direction that tends to bring the connecting shaft 19 into the locking zone 442a', 442b' of the receiving housings 44a', 44b' of the connector 4'.

More specifically, the connector 4' is first of all engaged in the accommodating volume 150' of the drive arm 1' from the front end 11 thereof, in a direction substantially parallel to the longitudinal direction (X) of the drive arm P. The direction of engagement of the connector 4' with the drive arm 1' is indicated by the arrow F3 in FIG. 7. More specifically still, the connector 4' is engaged with the drive arm 1' in such a way that the locking zone 442a', 442b' is situated between the above-described entrance 440a', 440b' and the front terminal part of the front end 11 of the drive arm 1'.

It must be appreciated here that, when the wiper system according to the invention is installed on a motor vehicle, in a context in which the travel of the drive arm 1' is small, the upper edges 410a', 410b' of the upper uprights 41a', 41b' slide bearing against the connecting shaft 19, guiding the latter as far as the entrances 440a', 440b' of the receiving housings 44a', 44b'. This allows the connector 4' to be assembled with the drive arm 1' more easily. This guidance is continued, during the relative sliding of the connector 4' with respect to the drive arm 1', by the connecting shaft 19 being guided between the inclined edges 4410a', 4410b', 4411a', 4411b' of the first part 441a', 441b' of the receiving housing 44a', 44b' until the connecting shaft 19 is locked by snap-fastening in the locking zones 442a', 442b'.

In other words, according to the embodiment of the invention more particularly illustrated in FIGS. 5 and 6, the upper edges 410a', 410b' of the upper uprights 41a', 41b' of the connector 4', and the inclined edges 4410a', 4410b', 4411a', 4411b' of the first part 441a', 441b' of the receiving housings 44a', 44b' form a guide member 45' guiding the connecting shaft 19 borne by the drive arm 1' with respect to the connector 4'.

The invention, such as has just been described according to two distinct embodiments, therefore offers a simple solution to replacing the wiper 3 of a wiper system 100, particularly in the context of reduced, or even zero, visibility and low accessibility, from a user perspective, of the region via which the connector 4, 4' is attached to the drive arm 1, 1'.

The invention is not limited to the means and configurations described and illustrated, however, and also applies to all equivalent means or configurations and to any combination of such means.

What is claimed is:

1. A wiper system for a motor vehicle, comprising a drive arm and a wiper which are connected to one another by a connecting device which comprises a connector secured to the wiper and a connecting shaft borne by the connector, the drive arm comprising a first end via which it is attached to a drive means; a second end, opposite to the first end in a longitudinal direction of the drive arm; and two receiving walls arranged symmetrically one on each side of a longitudinal midplane of the drive arm, the connecting device further comprising a plurality of receiving housings for receiving the connecting shaft, one of said receiving housings being arranged in each of the two receiving walls and situated in an accommodating volume of the drive arm, the receiving housing comprising an entrance by means of which the connecting shaft is received in the receiving housing and a locking zone for locking the connecting shaft, the locking zone being positioned between the entrance of the receiving housing and the second end of the drive arm, characterized in that the drive arm comprises a guide member which comprises a main wall that is inclined towards the entrance of the receiving housing receiving the connecting shaft.

2. The wiper system as claimed in claim 1, characterized in that the guide member comprises a bearing wall for the connecting shaft to bear against.

3. The wiper system as claimed in claim 2, characterized in that the drive arm comprises a low wall for immobilizing the connector.

4. The wiper system as claimed in claim 1, characterized in that the drive arm does not have a stable disengaged position.

5. A method for dismantling the wiper from the drive arm of a wiper system as claimed in claim 1, which comprises a step of relative translational movement of the connecting shaft with respect to the receiving housing along a guide member of the wiper system.

\* \* \* \* \*